US 6,631,239 B1

(12) United States Patent
Hamada

(10) Patent No.: US 6,631,239 B1
(45) Date of Patent: Oct. 7, 2003

(54) IMAGE PROCESSING APPARATUS, IMAGE PROCESSING METHOD AND STORAGE MEDIUM

(75) Inventor: Tetsuya Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/318,760

(22) Filed: May 26, 1999

(30) Foreign Application Priority Data

May 29, 1998 (JP) ............................................ 10-149128

(51) Int. Cl.[7] ................................................. H04N 5/93
(52) U.S. Cl. ............................ 386/52; 360/13; 380/201
(58) Field of Search ....................... 386/1, 4, 52, 63–64, 386/94, 109; 360/13; 369/83, 84; 345/723; 380/201–202, 55–54; 382/100, 232; 713/176; 709/217

(56) References Cited

U.S. PATENT DOCUMENTS

| | | | |
|---|---|---|---|
| 5,239,625 A | | 8/1993 | Bogart et al. |
| 5,764,607 A | * | 6/1998 | Maeda et al. .................. 369/84 |
| 5,796,869 A | * | 8/1998 | Tsuji et al. .................. 382/203 |
| 5,822,436 A | * | 10/1998 | Rhoads ........................ 380/54 |
| 5,907,657 A | * | 5/1999 | Shima .......................... 386/94 |
| 6,002,772 A | * | 12/1999 | Saito ........................... 380/202 |
| 6,192,184 B1 | * | 2/2001 | Shiota et al. ................. 386/52 |
| 6,269,394 B1 | * | 7/2001 | Kenner et al. ............... 709/217 |
| 6,278,447 B1 | * | 8/2001 | Anderson .................... 345/723 |

FOREIGN PATENT DOCUMENTS

| | | | |
|---|---|---|---|
| EP | 0 550 374 | | 7/1993 |
| EP | 0 651 554 | | 5/1995 |
| EP | 0 712 096 | | 5/1996 |
| JP | 10-108129 | * | 4/1998 |
| JP | 410108129 | * | 4/1998 |

* cited by examiner

Primary Examiner—Thai Tran
Assistant Examiner—Christopher Onuaku
(74) Attorney, Agent, or Firm—Fitzpatrick, Cella, Harper & Scinto

(57) ABSTRACT

It is controlled that working such as image editing or the like is not reflected on the part concerning copyright information or the like never intended to be overwritten or erased by a user, so that image data such as the copyright information or the like can be effectively protected. To achieve this, an image processing apparatus comprises an image editing unit and an image change unit as image editing means for editing the image data, and further comprises an image change exception unit for performing control not to apply the image change by the image editing to the image data representing a specific area or specific image data, such that the editing does not influence the image data of the specific area (e.g., image part in which copyright information, logo information, date information or the like has been written) or the specific image data.

52 Claims, 5 Drawing Sheets

IMAGE PROCESSING APPARATUS, IMAGE PROCESSING METHOD AND STORAGE MEDIUM

BACKGROUND OF THE INVENTION

1. Field of the Invention

The present invention relates to an image processing apparatus, an image processing method and a storage medium.

2. Related Background Art

FIG. 5 is a schematic structural view showing one example of a conventional recording system. In FIG. 5, numeral 501 denotes a host computer used when a user performs image editing and manages a recording apparatus 505 actually printing image data. Numeral 502 denotes an image editing software running on the host computer 501. Numeral 503 denotes a printer driver for changing the format of the image data in the host computer 501 into the printable format when the recording apparatus 505 prints the data. Numeral 504 denotes a communication unit for performing communication between the host computer 501 and recording apparatus 505.

Subsequently, an operation of the conventional recording system having such the structure as above will be explained hereinafter. The conventional recording system is composed of the host computer 501 for performing image change and the recording apparatus 505 for performing the actual image printing. The user utilizes the image editing software 502 on the side of the host computer 501 to perform a necessary working to the image data intended to be printed. For example, by utilizing the software 502, the user performs change of color, change of an image size, or partial change of the image data. Then, after the printer driver 503 changes the format of the changed image data into the data format printable in the recording apparatus 505, the changed data is transferred to the recording apparatus 505 through the communication unit 504. Thus, the user can actually obtain the printed results.

Since the conventional recording system has been structured as described above, even if the information concerning copyright of the image, logo, date and the like has been written into the image data intended to be printed, such the information can be easily overwritten or erased by utilizing the image editing software 502 or the like. For this reason, there has arisen the problem that the copyright information or the like is often overwritten or erased erroneously or intentionally, whereby it is difficult to retain the copyright information or the like in the image being the printed result.

As a countermeasure to prevent from erasing the copyright information or the like, it has been thought a method to prohibit the image editing by scrambling the image data according to a certain rule. However, in this method, there has also arisen the problem that the working (e.g., color balance adjustment, color change, image editing or the like) to the part other than the copyright information part is impossible, whereby the extremely unsatisfactory situation occurs according as the printed results.

SUMMARY OF THE INVENTION

An object of the present invention is to solve the above-described conventional problems.

Another object of the present invention is to perform image editing such that the image editing is not reflected on a feature of an image never intended to be changed.

As a preferable example to achieve the object, the present invention provides an image processing apparatus comprising:

a processing means for performing editing to image data corresponding to an image; and a control means for prohibiting the editing to a part of the image data.

Still another object of the present invention is to provide a novel function.

DETAILED DESCRIPTION OF PREFERRED EMBODIMENTS

First Embodiment

Hereinafter, the first embodiment will be explained with reference to the attached drawings.

Figure 1:
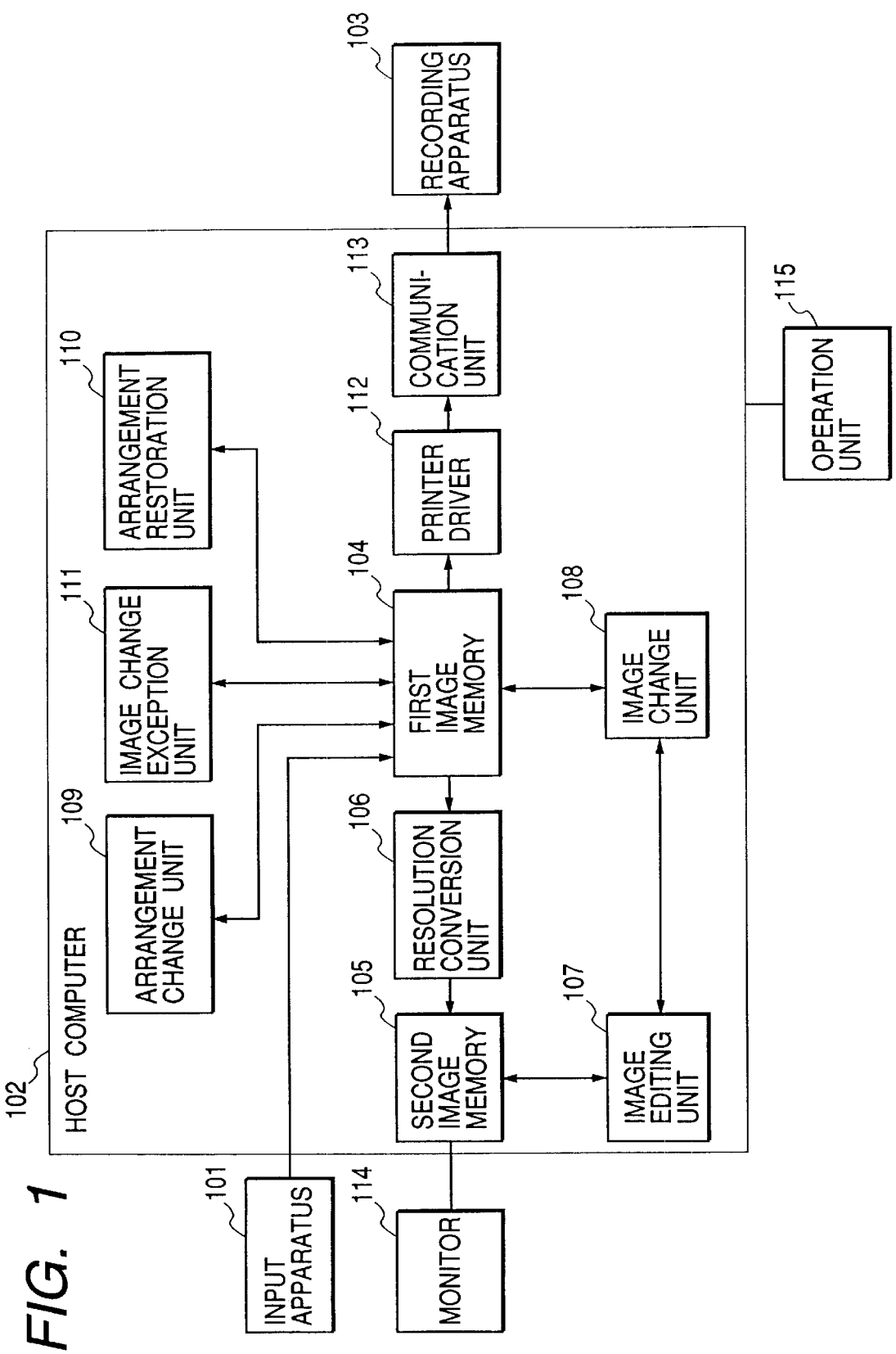
FIG. 1 is a block diagram showing the functional structure of a recording system according to the first embodiment of the present invention.
Figure 2:
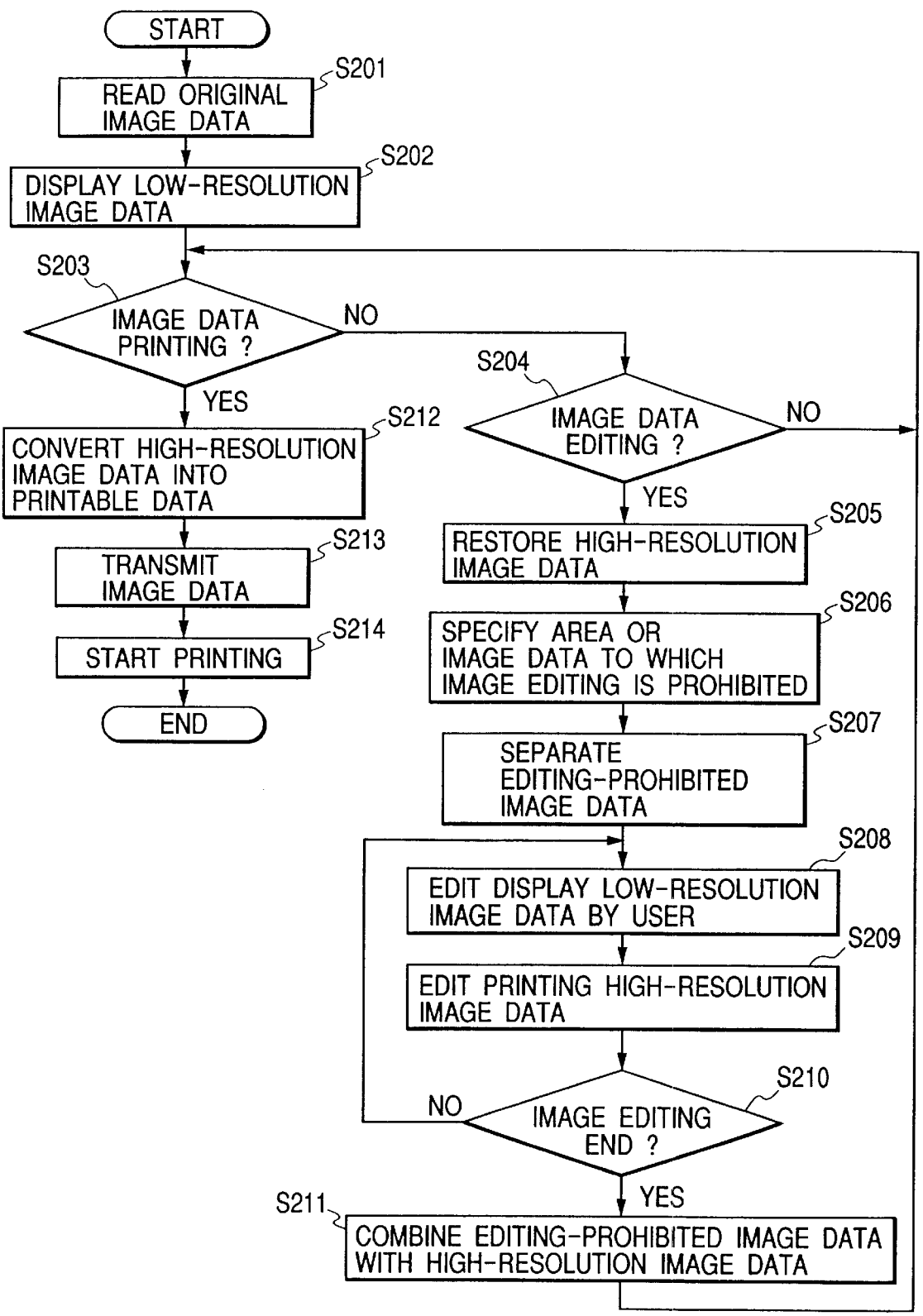
FIG. 2 is a flow chart showing the operation of the recording system according to the first embodiment.
Figure 3:
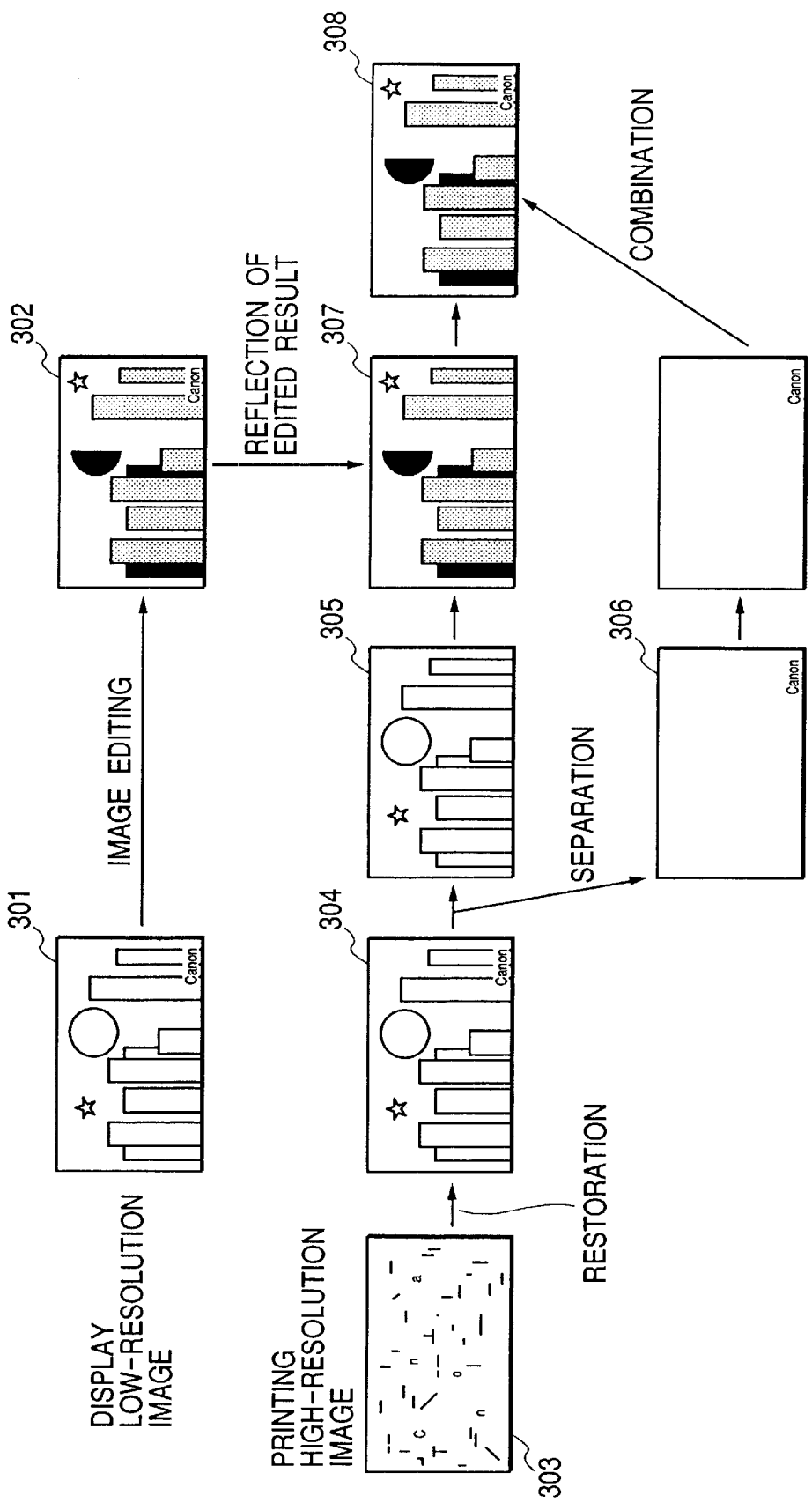
FIG. 3 is a schematic view for explaining an image editing process according to the first embodiment.

FIG. 1 is a block diagram showing the functional structure of a recording system according to the first embodiment, FIG. 2 is a flow chart showing the operation of the recording system shown in FIG. 1, and FIG. 3 is a schematic view for explaining an image editing process according to the first embodiment.

As shown in FIG. 1, the recording system according to the present embodiment is composed of an input apparatus (scanner, digital video camera, electron camera or the like) 101, a host computer 102 and a recording apparatus 103. A user performs image editing and management of the recording apparatus 103 by using the host computer 102, and the recording apparatus 103 actually performs printing of the image data.

In the host computer 102, numeral 104 denotes a first image memory in which the image data input from the input apparatus 101 is stored. Concretely, high-resolution image data used for printing (referred as printing high-resolution image data hereinafter) is stored in the first image memory 104. For example, a magnetic disk such as a hard disk or the like, an MO (magnetooptical disk), or a large-capacity storage medium such as a CD-RW (compact disk rewritable), a DVD (digital video disk) or the like is used as the memory 104.

Numeral 105 denotes a second image memory. The resolution of the printing high-resolution image data is converted by a resolution conversion unit 106, and the image data of which resolution has been converted is then stored in the second image memory 105. Concretely, low-resolution image data used for display on a monitor 114 (referred as display low-resolution image data hereinafter) is stored in the second image memory 105. For example, a storage medium such as a video RAM (random access memory) is used as the memory 105. In the present embodiment, although the printing high-resolution image data and the display low-resolution image data are respectively stored in the different memories, these two kinds of data may be stored as one file by using an image file of image data format capable of having plural different image data.

Numeral 107 denotes an image editing unit which performs various editing such as adjustment of color balance, change of color, addition of special effects, adjustment of gradation, deletion of partial image, synthesis of another image and the like, to the display low-resolution image data not used in printing. By such a structure as processes the low-resolution image data, it is possible to realize high-speed processing. Numeral 108 denotes an image change unit in which the contents of the editing performed by the image editing unit 107 is reflected in the printing high-resolution image data stored in the first image memory 104.

Numeral 109 denotes an arrangement change unit. In the unit 109, the arrangement of the image data is changed according to a certain rule to disable the printing high-resolution image data stored in the first image memory 104 from being directly edited. Numeral 110 denotes an arrangement restoration unit. In the unit 110, the arrangement of the printing high-resolution image data which can not be directly edited because its data arrangement has been previously changed by the arrangement change unit 109 is restored on the basis of a predetermined rule. In the first memory 104, the restored image data is then stored at an area different from the area at which the arrangement-changed printing high-resolution image data is stored. If the storage capacity of the second image memory 105 has room to store other data, the restored image data may be stored in the second image memory 105.

In the image change unit 108, in a case where the arrangement of the printing high-resolution image data has not been changed from the beginning, the edited contents of the image edit unit 107 are directly reflected in the printing high-resolution image data. On the other hand, in a case where the arrangement of the printing high-resolution image data has been changed by the arrangement change unit 109 thereby disabling the printing high-resolution image data from being directly edited, the edited contents of the image editing unit 107 are reflected in the image data of which arrangement has been restored by the arrangement restoration unit 110.

Numeral 111 denotes an image change exception unit which performs control not to apply the image change by the image change unit 108 to the image data representing a specific area or to specific image data. The detailed processing to do so will be explained later with reference to FIGS. 2 and 3. Numeral 112 denotes a printer driver which changes the format of the image data (i.e., printing high-resolution image data changed by image change unit 108 on the basis of edited contents of image editing unit 107) output from the first image memory 104 into a printable format capable of being printed by the recording apparatus 103. Numeral 113 denotes a communication unit which transmits the image data of the printable format to the recording apparatus 103.

In FIG. 2, a step S201 is the original image read step in which an image file is read and entered into image editing and printing applications. In this case, the image file is made of the image format capable of having the plural different image data including the printing high-resolution image data and the display low-resolution image data. A step S202 is the low-resolution image display step in which the display low-resolution image data included in the read image file and transferred from the second image memory 105 is displayed on the monitor 114.

A step S203 is the printing judgment step in which it is judged whether or not the image data displayed on the monitor 114 is to be printed out. Namely, it is judged whether or not instructions for the printing has been input by the user. A step S204 is the image editing judgment step in which it is judged whether or not the working such as the editing or the like is to be performed to the low-resolution image data displayed on the monitor 114. Namely, it is judged whether or not instructions for the working has been input by the user.

A step S205 is the high-resolution image restoration step in which the image data arrangement is restored based on the predetermined rule, in the image file having the printing high-resolution image data which can not be directly edited because its data arrangement has been previously changed according to the certain rule. A step S206 is the editing-prohibited image specifying step in which the area or the image data to which the image editing is prohibited is specified.

A step S207 is the image separation step in which the editing-prohibited image data is separated from the printing high-resolution image data. A step S208 is the low-resolution image editing step in which the display low-resolution image data is edited and changed (or amended) by the user. A step S209 is the high-resolution image editing step in which the editing to the display low-resolution image data is reflected in the printing high-resolution image data. A step S210 is the image editing end judgment step in which it is judged whether or not the image editing ends.

A step S211 is the image data combination step in which the editing-prohibited image data separated in the image separation step S207 is combined with the edited and changed printing high-resolution image data. A step S212 is the image conversion step in which the printing high-resolution image data is converted into the data printable in the recording apparatus 103. A step S213 is the image data transmission step in which the converted high-resolution image data is transmitted to the recording apparatus 103. A step S214 is the printing start step in which the recording apparatus 103 starts the printing.

In FIG. 3, numeral 301 denotes a low-resolution image used for display (referred as display low-resolution image hereinafter) obtained before the image editing is performed, and numeral 302 denotes a display low-resolution image obtained after the image editing is performed. Numeral 303 denotes a high-resolution image used for printing (referred as printing high-resolution image hereinafter). The printing high-resolution image 303 can not be directly edited because the image data arrangement thereof has been previously changed according to the certain rule. Numeral 304 denotes a printing high-resolution image in which the data arrangement thereof has been restored according to the predetermined rule.

Numeral 305 denotes a printing high-resolution image obtained after the image data to which the editing and change (or amendment) are prohibited is separated. Numeral 306 denotes the image data which was separated from the image 304 and to which the editing and change are prohibited. Numeral 307 denotes a printing high-resolution image in which the editing and change performed to the image 302 are reflected. Numeral 308 denotes a final printing high-resolution image in which the separated image data 306 to which the editing and change are prohibited is combined with the print high-resolution image 307 in which the editing and change performed to the display low-resolution image 302 are reflected.

Subsequently, the operation to be performed by the above-described structure will be explained in detail with reference to FIGS. 2 and 3.

In case of the printing by using the recording system of the present embodiment, the user handles the host computer 102 to read the image intended to be printed and then performs the editing according to necessity.

In the original image read step S201, the image file made of the image format capable of having the plural different image data including the printing high-resolution image data intended to be printed and the display low-resolution image data is read and entered into the image editing and printing applications. At this time, the display low-resolution image is the image 301, and the printing high-resolution image is the image 303 which can not be directly edited because the image data arrangement thereof has been previously changed according to the certain rule.

Subsequently, in the low-resolution image display step S202, the display low-resolution image 301 in the read image file is displayed on the display unit such as the monitor 114 or the like. In the subsequent printing judgment step S203, it is judged whether or not the displayed image (data) 301 is to be printed out. In this step, if judged that the instructions for printing the image 301 is not input from the printer driver 112 by the operator, then the flow advances to the image editing judgment step S204. In the step S204, it is judged whether or not the editing such as the color change, image data change, image data addition or the like according to the interactive editing instruction by the operator is to be performed.

If judged in the step S204 that the image editing is to be performed, the flow advances to the high-resolution image restoration step S205. In this step, the data arrangement of the image 303 to which the direct editing based on an image data binary file or the like is impossible because its data arrangement has been previously changed is restored according to the predetermined rule, thereby obtaining the ordinary printing high-resolution image 304.

Subsequently, in the editing-prohibited image specifying step S206, the area or the image data in the image 304 to which the image editing is not performed is specified. In this step, the part of the image data at which copyright information, logo information, date information or the like has been written is specified as the area to which the image editing is not performed. Such the specifying is performed by referring to the predetermined header portion in the image file.

If such the editing-prohibited image data is specified, then the flow advances to the image separation step S207. In this step, the printing (or editing) high-resolution image 305 and the editing-prohibited image 306 are obtained from the image 304. Subsequently, in the low-resolution image editing step S208, the user interactively handles an operation unit 115 to perform the editing, change or amendment of the image 301 (i.e., color change, image data change, image data addition or the like), and resultingly obtains the display low-resolution image 302.

In the high-resolution image editing step S209, the image change added to the image 301 is reflected in the image 305 by using a command string corresponding to the image change obtained by the above editing, amendment or the like and stored in a not-shown memory of the image editing unit 107. After the image editing, the high-resolution image 307 is obtained. Then, in the image editing end judgment step S210, it is judged whether or not the image editing ends. If the image editing ends, the flow advances to the subsequent image data combination step S211. In this step, the image 306 separated in the image separation step S207 is again combined with the image 307 finally obtained after the editing is performed. Thus, the final printing high-resolution image 308 can be obtained.

In case of printing the final image 308, the flow advances from the printing judgment step S203 to the image conversion step S212. In this step, the generated image 308 is converted into the data printable in the recording apparatus 103. The converted image 308 is transmitted to the recording apparatus 103 in the image data transmission step S213. Then, in the printing start step S214, the printing starts.

As explained above in detail, according to the present embodiment, in the recording system which includes the software and the recording apparatus for editing and printing the image file of the image data format capable of having the plural different image data, in the case where the display low-resolution image data not used for the printing is edited and the result of such the editing is reflected in the printing high-resolution image data, the editing is not applied to the image data of the predetermined specific area or the specific image data (e.g., part at which information such as copyright of image, logo or date has been written). Therefore, the specific image such as copyright information or the like is not overwritten or erased in the editing, whereby it is possible to effectively protect the specific image and easily retain it in the printed result.

Further, as to the printing high-resolution image data of which data arrangement has been previously changed according to the certain rule, the editing is performed after the data arrangement is restored. Therefore, it is possible to prevent that the specific image data included in the high-resolution image data is directly edited. That is, the editing becomes possible after the data arrangement is restored. Even in this case, the specific data is not influenced by the editing, whereby it is possible to effectively protect the copyright information and the like.

In the present embodiment, the editing-prohibited image has been explained as the specific part in the image. However, the present embodiment is applicable to the case where the editing-prohibited image is the entire printing high-resolution image.

Further, in the present embodiment, the editing is performed to the display low-resolution image data not used for the printing, and the edited result is reflected in the printing high-resolution image data to indirectly edit the high-resolution image data. However, after the image of the part to which the editing is prohibited is separated, the editing may be directly performed to the high-resolution image data at the part to which the editing is not prohibited.

Further, the present embodiment is applicable to a case where the information such as copyright, date, logo or the like has been written at the specific area as an electronic watermark (invisible) of which frequency has been converted. Further, such the information may be written as an image having a color difficult to be perceived by human eyes.

Second Embodiment

Subsequently, the second embodiment will be explained with reference to the attached drawings.

In the above-described first embodiment, the processes from the arrangement restoration of the printing high-resolution image data to the generation of the final printing high-resolution image data (i.e., generation of images 304 to 308 shown in FIG. 3) are entirely performed in the host computer 102. However, in the second embodiment, these processes are performed in the recording apparatus 103.

For this reason, in the structure of the recording system according to the second embodiment, the image change unit 108, the arrangement restoration unit 110, the image change exception unit 111 and the printer driver 112 are provided in the recording apparatus 103. At the side of the host computer 102, a storage means for storing information concerning an image editing history added to the display low-resolution image data is provided. Thus, the communication unit 113 transmits not only the printing high-resolution image data but also the image editing history information to the recording apparatus 103.

Figure 4:
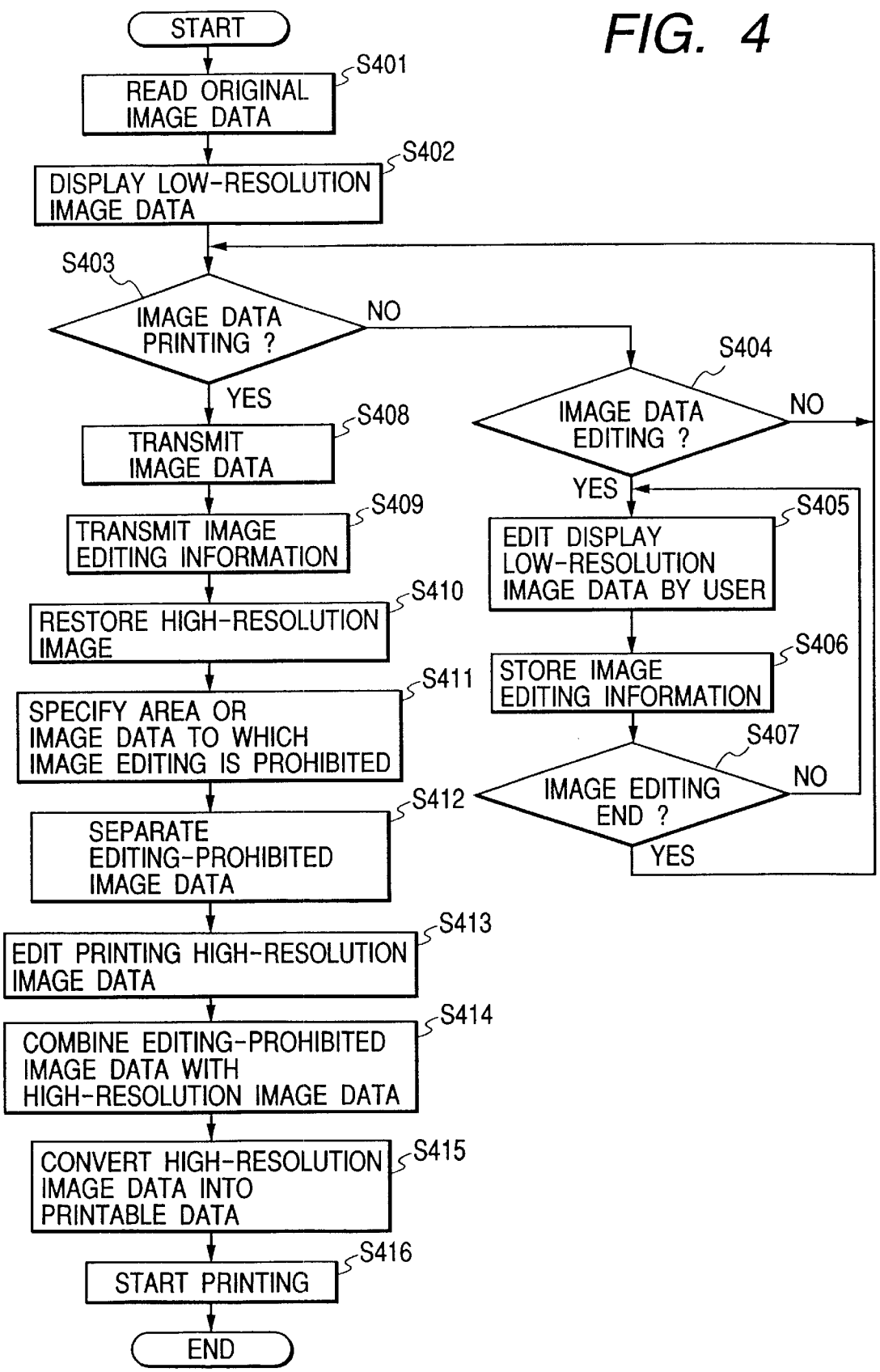
FIG. 4 is a flow chart showing the operation of a recording system according to the second embodiment of the present invention.
Figure 5:
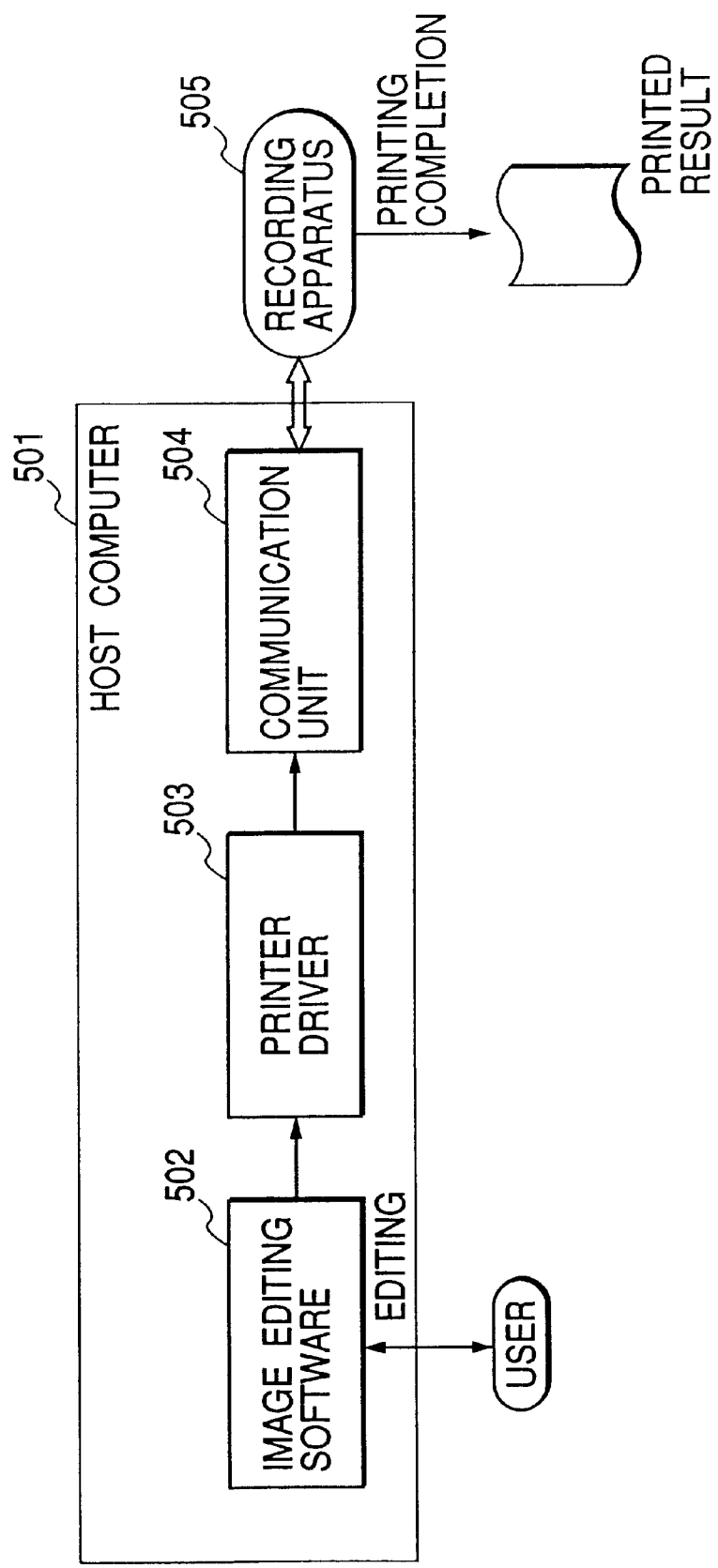
FIG. 5 is a view showing an example of the structure of a conventional recording system.

FIG. 4 is a flow chart showing the operation of the recording system according to the second embodiment.

In FIG. 4, a step S401 is the original image read step in which the image file is read and entered into the image editing and printing applications. In this case, the image file is made of the image format capable of having the plural different image data including the printing high-resolution image data and the display low-resolution image data. A step S402 is the low-resolution image display step in which the display low-resolution image data included in the read image file is displayed on the monitor connected to the host computer 102.

A step S403 is the printing judgment step in which it is judged whether or not the image data displayed on the monitor is to be printed out. A step S404 is the image editing judgment step in which it is judged whether or not the working such as the editing or the like is to be performed to the low-resolution image data displayed on the monitor, and a step S405 is the low-resolution image editing step in which the display low-resolution image data is edited, changed or amended (i.e., color change, image data change or image data addition is performed).

A step S406 is the image editing information storage step in which the history of the editing and amendment of the display low-resolution image data performed at the operation unit by the user. A step S407 is the image editing end judgment step in which it is judged whether or not the image editing ends. A step S408 is the high-resolution image transmission step in which the image file having the printing high-resolution image data which can not be directly edited because its data arrangement has been previously changed according to the certain rule is transmitted to the recording apparatus 103.

A step S409 is the image editing information transmission step in which the image editing information stored in the image editing information storage step S406 is transmitted to the recording apparatus 103. A step S410 is the high-resolution image restoration step in which the arrangement of the received printing high-resolution image data is restored based on the predetermined rule. A step S411 is the editing-prohibited image specifying step in which the area or the image data to which the image editing is prohibited is specified. A step S412 is the image separation step in which the image to which the editing is not performed is separated from the printing high-resolution image data.

A step S413 is the high-resolution image editing step in which the user's editing to the display low-resolution image data is reflected in the printing high-resolution image data on the basis of the received image editing information. A step S414 is the image data combination step in which the editing-prohibited image data separated in the image separation step S412 is combined with the edited and/or changed printing high-resolution image data. A step S415 is the image conversion step in which the printing high-resolution image data is converted into the data printable in the recording apparatus 103. A step S416 is the printing start step in which the recording apparatus 103 starts the printing of the converted high-resolution image data.

Subsequently, the operation to be performed by the above-described structure will be explained in detail with reference to FIGS. 3 and 4.

In case of the printing by using the recording system of the present embodiment, the user handles the host computer 102 to read the image intended to be printed and then performs the editing according to necessity.

In the original image read step S401, the image file made of the image format capable of having the plural different image data including the printing high-resolution image data intended to be printed and the display low-resolution image data is read and entered into the image editing and printing applications. At this time, the display low-resolution image is the image 301, and the printing high-resolution image is the image 303 which can not be directly edited because the image data arrangement thereof has been previously changed according to the certain rule.

Subsequently, in the low-resolution image display step S402, the display low-resolution image 301 in the read image file is displayed on the display unit such as the monitor 114 or the like connected to the host computer 102. In the subsequent printing judgment step S403, it is judged whether or not the displayed image 301 is to be printed out. If judged in this step that the instructions for printing the image 301 is not input, then the flow advances to the image editing judgment step S404 to judge whether or not the image editing such as color change, image data change, image data addition or the like is to be performed.

If judged in the step S404 that the image editing is to be performed, the user edits and/or amends the image 301 and resultingly obtains the display low-resolution image 302 in the low-resolution image editing step S405. On the other hand, the contents of the image editing and/or amendment added to the image 301 are sequentially stored as the editing information in the image editing information storage step S306. In this step, the editing information is stored as the history in the storage means (e.g., provided in image editing unit 107) of the host computer 102. Then, in the image editing end judgment step S407, it is judged whether or not the image editing ends. If the image editing.ends, the flow advances to the step S403 to print the image.

In case of printing the image, in the high-resolution image transmission step S408, the image 303 to which the direct editing based on an image data binary file or the like is impossible because its data arrangement has been previously changed is transmitted to the recording apparatus 103. Subsequently, in the image editing information transmission step S409, the editing information which has been stored as the history of the editing performed by the user to the image 301 is transmitted to the recording apparatus 103.

The recording apparatus 103 which received the image 303 transmitted from the host computer 102 in the step S408 restores the image arrangement according to the predetermined rule in the high-resolution image restoration step S310 to obtain the ordinary printing high-resolution image 304. Subsequently, in the editing-prohibited image specifying step S411, the area or the image data to which the image editing is not performed is specified in the restored image 304. In this step, the part at which copyright information, logo information, date information or the like has been written is specified. Such the specifying is realized by discriminating whether or not the information such as the image copyright, the logo, the date or the like exists in the predetermined area in the image 303. Further, if the printing high-resolution image has the predetermined format and the information such as the image copyright, the logo, the date or the like has Lis been written into the header of the predetermined format, such the specifying is performed by referring to this header.

If such the editing-prohibited image data is specified, then the flow advances to the image separation step S412. In this step, the editing high-resolution image 305 and the editing-prohibited image 306 are obtained from the image 304. In the subsequent high-resolution image editing step S413, on the basis of the editing information which has been stored as the history of the editing performed by the user to the image 301 and received in the step S409, the image change added to the image 301 is reflected in the image 305, thereby resultingly obtaining the post-editing high-resolution image 307.

Subsequently, in the image data combination step S414, the image 306 separated in the image separation step S412 is again combined with the post-editing image 307 finally obtained in the high-resolution image editing step S413 to obtain the final printing high-resolution image 308. In the image conversion step S415, the generated image 308 is converted into the data printable in the recording apparatus 103. The converted image 308 is then printed by the recording apparatus 103 in the printing start step S416.

Like the first embodiment, it is possible in the present embodiment to prevent that the information such as the image copyright, the logo, the date or the like is directly edited. Further, even in the case where the editing is performed after the data arrangement is restored, the copyright information or the like is not overwritten or erased, whereby it is possible to effectively protect the image data such as the copyright information or the like.

Further, since the image restoration, the editing and the printing are collectively performed at the side of the recording apparatus, for example, it is possible to simultaneously perform the image data change and the data conversion into printing data by utilizing a dedicated line, whereby it is possible to perform a higher-speed printing process. Further, since the host computer 102 can be released from the editing as quickly as possible, the computer 102 can be free during the printing process.

Also in the present embodiment, the editing-prohibited image has been explained as the specific part in the image. However, the present embodiment is applicable to the case where the editing-prohibited image is the entire printing high-resolution image.

Further, since the copyright on the edited image is given to the operator who performed the editing, the copyright information which has been previously stored and registered in the computer 102 by the operator may be combined with the edited image when the editing-prohibited image data is combined with the edited image. In the present embodiment, the registered copyright information is transmitted together with the editing information to the recording apparatus 103, and the above combination is performed in the apparatus 103.

As described above, according to the present embodiment, the means for performing the control not to apply the change due to the image editing to the image data of the specific area or to the specific image data when the image data is edited is provided. Thus, it is possible to easily protect the specific image such as the copyright information or the like and retain it as the printed result.

Further, according to another feature, the arrangement of the high-resolution image data which can not be directly edited because its data arrangement has been previously changed according to the certain rule is restored according to the predetermined rule, and the image editing is performed to the restored image data, whereby it is possible to prevent that the specific image data included in the high-resolution image data is directly edited. Further, even in the case where the image editing is performed after the data arrangement is restored, since the image data has been specified as the image data to which the image editing is prohibited, it is possible to prevent that the specific image data is changed, transformed or erased, thereby effectively protecting the specific image data.

Further, according to another feature, the low-resolution image data is edited, the editing information at that time is transmitted to the recording apparatus together with the high-resolution image data, and the high-resolution image data is edited based on the transmitted editing information at the side of the recording apparatus, whereby it is possible to collectively perform the image editing and printing (including restoration of transmitted high-resolution image data if data arrangement thereof has been previously changed) at the side of the recording apparatus. Therefore, for example, it is possible to simultaneously perform the image data editing and the data conversion into printing data by utilizing the dedicated line, whereby it is possible to perform a higher-speed printing process.

Other Embodiments

The recording system according to the present invention may be applied to the above system including the plural equipments (e.g., host computer, interface equipment, reader, printer and the like), or to one equipment (e.g., one equipment integrally including copying machine, scanner, fax machine and printer).

Further, the present invention includes a case where program codes of software for realizing the functions of the above embodiments are supplied to a computer provided in an apparatus connected to various devices or to a system so as to operate the various devices or the system, and thus the various devices or the system are operated according to the program codes stored in the computer (CPU or MPU).

In this case, the program codes themselves realize the functions of the above embodiments. Therefore, the program codes themselves and a means (e.g., storage medium storing program codes) for supplying the program codes to the computer constitute the present invention. As the storage medium for storing the program codes, e.g., a floppy disk, a hard disk, an optical disk, a magnetooptical disk, a CD-ROM, a magnetic tape, a non-volatile memory card, a ROM and the like can be used.

Further, it can be obviously understood that the present invention includes not only a case where the computer executes the supplied program codes to realize the functions of the above embodiments, but also a case where an OS (operating system) running on the computer or another application software realizes the functions of the above embodiments.

Further, it can be obviously understood that the present invention also includes a case where, after the supplied program codes are stored in a memory provided in a function expansion board of the computer or a function expansion unit connected to the computer, a CPU or the like provided in the function expansion board or the function expansion unit performs a part or all of the actual processes on the basis of the instructions of the program codes, and thus the functions of the above embodiments are realized by such the processes.

As many apparently widely different embodiments of the present invention can be made without departing from the spirit and scope thereof, it is to be understood that the present invention is not limited to the specific embodiments thereof expect as defined in the appended claims.

What is claimed is:

1. An image processing apparatus comprising:
   processing means for performing editing of image data corresponding to an image; and
   control means for prohibiting the editing of an edit-prohibited part of the image data,
   wherein the editing is performed after the edit-prohibited part of the image data is separated.

2. An apparatus according to claim 1, wherein the editing is interactively performed to low-resolution image data corresponding to the image data.

3. An apparatus according to claim 2, wherein said control means prohibits the editing in a case where the editing contents are reflected in high-resolution image data corresponding to the image.

4. An apparatus according to claim 3, wherein the editing is performed to the low-resolution image data corresponding to the image displayed on a monitor, and the high-resolution image data in which the editing contents have been reflected is printed out.

5. An apparatus according to claim 4, wherein the low-resolution image data and the high-resolution image data are included in one image file.

6. An apparatus according to claim 1, wherein the editing is any of color editing, image data change, and image data addition.

7. An apparatus according to claim 1, wherein the edit-prohibited part of the image data is any of data concerning a copyright, a logo, and date information.

8. An apparatus according to claim 1, wherein the edit-prohibited part of the image data exists in the header of the image data.

9. An apparatus according to claim 1, wherein the edit-prohibited part of the image data exists as an electronic watermark.

10. An apparatus according to claim 1, wherein the edit-prohibited part of the image data exists as an image having a color difficult to be perceived by human eyes.

11. An apparatus according to claim 1, further comprising reception means for receiving the editing contents and the image data from an external apparatus.

12. An apparatus according to claim 1, wherein the editing is performed after the edit-prohibited part of the image data is separated, and the edit-prohibited part of the image data and copyright information generated as a result of the editing are added to the image data obtained after the editing is performed.

13. An image processing method comprising:
    a processing step, of performing editing of image data corresponding to an image; and
    a control step, of prohibiting the editing of an edit-prohibited part of the image data,
    wherein the editing is performing after the edit-prohibited part of the image data is separated.

14. A method according to claim 13, wherein the editing is interactively performed to low-resolution image data corresponding to the image data.

15. A method according to claim 14, wherein said control step prohibits the editing in a case where the editing contents are reflected in high-resolution image data corresponding to the image.

16. A method according to claim 15, wherein the editing is performed to the low-resolution image data corresponding to the image displayed on a monitor, and the high-resolution image data in which the editing contents have been reflected is printed out.

17. A method according to claim 16, wherein the low-resolution image data and the high-resolution image data are included in one image file.

18. A method according to claim 13, wherein the editing is any of color editing, image data change, and image data addition.

19. A method according to claim 13, wherein the edit-prohibited part of the image data is any of data concerning a copyright, a logo, and date information.

20. A method according to claim 13, wherein the edit-prohibited part of the image data exists in the header of the image data.

21. A method according to claim 13, wherein the edit-prohibited part of the image data exists as an electronic watermark.

22. A method according to claim 13, wherein the edit-prohibited part of the image data exists as an image having a color difficult to be perceived by human eyes.

23. A method according to claim 13, further comprising a reception step of receiving the editing contents and the image data from an external apparatus.

24. A method according to claim 13, wherein the editing is performed after the edit-prohibited part of the image data is separated, and the edit-prohibited part of the image data and copyright information generated as a result of the editing are added to the image data obtained after the editing is performed.

25. A computer-readable storage medium which contains a program to achieve an image processing method comprising:
    a processing step, of performing editing of image data corresponding to an image; and
    a control step, of prohibiting the editing of an edit-prohibited part of the image data,
    wherein the editing is performed after the edit-prohibited part of the image data is separated.

26. An image processing apparatus comprising:
    processing means for performing an editing process on an image; and
    control means for prohibiting the editing process from being performed on image data of an edit-prohibited part of the image.

27. An apparatus according to claim 26, wherein the editing process is interactively performed to low-resolution image data corresponding to the image data.

28. An apparatus according to claim 27, wherein said control means prohibits the editing process in a case where the editing contents are reflected in high-resolution image data corresponding to the image.

29. An apparatus according to claim 28, wherein the editing process is performed to the low-resolution image data corresponding to the image displayed on a monitor, and the high-resolution image data in which the editing contents have been reflected is printed out.

30. An apparatus according to claim 29, wherein the low-resolution image data and the high-resolution image data are included in one image file.

31. An apparatus according to claim 26, wherein the editing process is any of color editing, image data change, and image data addition.

32. An apparatus according to claim 26, wherein the image data of the edit-prohibited part of the image is any of data concerning a copyright, a logo, and data information.

33. An apparatus according to claim 26, wherein the image data of the edit-prohibited part of the image exists in the header of the image data.

34. An apparatus according to claim 26, wherein the image data of the edit-prohibited part of the of the image exists as an electronic watermark.

35. An apparatus according to claim 26, wherein the image data of the edit-prohibited part of the image exists as an image having a color difficult to be perceived by human eyes.

36. An apparatus according to claim 26, further comprising reception means for receiving the editing contents and the image data from an external apparatus.

37. An apparatus according to claim 26, wherein the editing process is performed after the edit-prohibited part of the image data is separated.

38. An apparatus according to claim 26, wherein the editing process is performed after image data of the edit-prohibited part of the image is separated, and the image data of the edit-prohibited part of the image and copyright information generated as a result of the editing process are added to the image data obtained after the editing process is performed.

39. An image processing method comprising:
   a processing step, of performing an editing process on an image; and
   a control step, of prohibiting the editing process from being performed on image data of a edit-prohibited part of the image.

40. A method according to claim 39, wherein the editing process is interactively performed to low-resolution image data corresponding to the image data.

41. A method according to claim 40, wherein said control step prohibits the editing process in a case where the editing contents are reflected in high-resolution image data corresponding to the image.

42. A method according to claim 41, wherein the editing process is performed to the low-resolution image data corresponding to the image displayed on a monitor, and the high-resolution image data in which the editing contents have been reflected is printed out.

43. A method according to claim 42, wherein the low-resolution image data and the high-resolution image data are included in one image file.

44. A method according to claim 39, wherein the editing process is any of color editing, image data change, and image data addition.

45. A method according to claim 39, wherein the image data of the edit-prohibited part of the image is any of data concerning copy right, a logo, and data information.

46. A method according to claim 39, wherein the image data of the edit-prohibited part of the image exists in the header of the image data.

47. A method according to claim 39, wherein the image data of the edit-prohibited part of the image exists as an electronic watermark.

48. A method according to claim 39, wherein the image data of the edit-prohibited part of the image exists as an image having a color difficult to be perceived by human eyes.

49. A method according to claim 39, further comprising a reception step of receiving the editing contents and the image data from an external apparatus.

50. A method according to claim 39, wherein the editing process is performed after the edit-prohibited part of the image data is separated.

51. A method according to claim 39, wherein the editing process is performed after image data of the edit-prohibited part of the image is separated, and the image data of the edit-prohibited part of the image and copy right information generated as a result of the editing process are added to the image data obtained after the editing process is performed.

52. A computer-readable storage medium which contains a program to achieve an image processing method comprising:
   a processing step, of performing an editing process on an image; and
   a control step, of prohibiting the editing process from being performed on image data of a edit-prohibited part of the image.

* * * * *

UNITED STATES PATENT AND TRADEMARK OFFICE
CERTIFICATE OF CORRECTION

PATENT NO.    : 6,631,239 B1
DATED         : October 7, 2003
INVENTOR(S)   : Tetsuya Hamada It is certified that error appears in the above-identified patent and that said Letters Patent is hereby corrected as shown below:

<u>Title page,</u>
Item [56], References Cited, FOREIGN PATENT DOCUMENT, "JP 410108129* 4/1998" should be deleted.

<u>Column 1,</u>
Line 26, "such the" should read -- such a --; and
Line 44, "such the" should read -- such --.

<u>Column 4,</u>
Lines 42 and 46, "(referred" should read -- (referred to --.

<u>Column 5,</u>
Lines 45 and 48, "such the" should read -- such --.

<u>Column 6,</u>
Line 6, "In" should read -- In the --; and
Lines 19 and 55, "such the" should read -- such --.

<u>Column 8,</u>
Line 45, "editing. ends," should read -- editing ends, --; and
Line 67, "such the" should read -- such --.

<u>Column 9,</u>
Line 5, "Lis" should be deleted; and
Line 6, "such the" should read -- such --.

<u>Column 11,</u>
Line 2, "such the" should read -- such --;
Line 15, "separated." should read -- separated, and the edit-prohibited part of the image data is added to the image data obtained after the editing is performed. --; and
Line 60, "separated." should read -- separated, and the edit-prohibited part of the image data is added to the image data obtained after the editing is performed. --.

UNITED STATES PATENT AND TRADEMARK OFFICE
CERTIFICATE OF CORRECTION

PATENT NO. : 6,631,239 B1
DATED : October 7, 2003
INVENTOR(S) : Tetsuya Hamada

It is certified that error appears in the above-identified patent and that said Letters Patent is hereby corrected as shown below:

Column 12,
Line 39, "separated." should read -- separated, and the edit-prohibited part of the image data is added to the image data obtained after the editing is performed. --; and
Line 46, "image." should read -- image,
     wherein the editing process is performed after the image data of the edit-prohibited part of the image is separated, and the image data of the edit-prohibited part of the image is added to the image data obtained after the editing process is performed. --.

Column 13,
Line 5, "of the of the" should read -- of the --;
Line 28, "a" should read -- an --;
Line 29, "image." should read -- image,
     wherein the editing process is performed after the image data of the edit-prohibited part of the image is separated, and the image data of the edit-prohibited part of the image is added to the image data obtained after the editing process is performed. --.

Column 14,
Line 9, "copy right," should read -- copyright, --;
Line 29, "copy right" should read -- copyright --;
Line 38, "a" should read -- an --; and
Line 39, "image." should read -- image,
     wherein the editing process is performed after the image data of the edit-prohibited part of the image is separated, and the image data of the edit-prohibited part of the image is added to the image data obtained after the editing process is performed. --.

Signed and Sealed this

Twenty-third Day of March, 2004

JON W. DUDAS
*Acting Director of the United States Patent and Trademark Office*